United States Patent [19]

Janssen et al.

[11] Patent Number: 4,690,503

[45] Date of Patent: Sep. 1, 1987

[54] GLASS OPTICAL FIBER HAVING A PRIMARY AND A SECONDARY COATING

[75] Inventors: Petrus J. Janssen; Peter C. Janssens, both of Eindhoven, Netherlands

[73] Assignee: U.S. Philips Corp., New York, N.Y.

[21] Appl. No.: 649,634

[22] Filed: Sep. 12, 1984

[30] Foreign Application Priority Data

Sep. 22, 1983 [NL] Netherlands ............... 8303252

[51] Int. Cl.$^4$ ............... G02B 6/16; G02B 6/22
[52] U.S. Cl. ............... 350/96.30; 350/96.34; 427/163
[58] Field of Search ............ 350/96.29, 96.30, 96.31, 350/96.32, 96.33, 96.34; 427/162, 163, 180, 212

[56] References Cited

U.S. PATENT DOCUMENTS

| 4,072,400 | 2/1978 | Claypoole et al. | 350/96.30 |
| 4,105,284 | 8/1978 | Olshansky | 350/96.33 |
| 4,114,981 | 9/1978 | Ishida et al. | 350/96.33 |
| 4,334,733 | 6/1982 | Takeshima et al. | 350/96.33 |

FOREIGN PATENT DOCUMENTS 2065324 6/1981 United Kingdom .

OTHER PUBLICATIONS

"Journal of Radiation Curing" by G. L. Schief, p.1-11, Apr. 1982.

Primary Examiner—William L. Sikes
Assistant Examiner—Akm E. Ullah
Attorney, Agent, or Firm—Marc D. Schechter

[57] ABSTRACT

Glass optical fiber having a primary coating constructed from two layers (having a total thickness 50–70 μm), in which the first layer on the fiber consists of UV cured acrylate resin having a modulus of elasticity at 25° C. less than or equal to 5 N/mm$^2$. The second layer is also a UV cured acrylate resin, but has a modulus of elasticity at 25° C. of from 25 to 1500 N/mm$^2$. The ratio of the thickness of the first layer to the thickness of the second layer is between 0.5 and 2.

3 Claims, 6 Drawing Figures

GLASS OPTICAL FIBER HAVING A PRIMARY AND A SECONDARY COATING

BACKGROUND OF THE INVENTION

The invention relates to a glass optical fiber having a primary coating of UV-cured acrylate resin and a secondary coating of a thermoplastic resin. The secondary coating is in intimate contact with the primary coating.

In manufacturing optical fibers by drawing from a preform, the drawn fiber is immediately provided with a primary coating. The primary coating has a thickness of approximately 60 microns and serves to maintain the integrity of the glass surface of the fiber. The primary coating protects the glass surface from the atmosphere and prevents the formation of scratches, in the glass surface. For example, the fiber could be scratched when it is wound on a reel or when it is provided with a secondary coating.

During cabling, an optical fiber may be exposed to comparatively large forces. The primary coating in these circumstances provides insufficient protection from mechanical damage to the optical fiber.

It is therefore common practice to give the primary-coated optical fiber a secondary coating. The secondary coating provides protection during cabling, and in the cable against mechanical load. The primary and secondary coatings usually consist of a synthetic resin.

The materials from which the optical fiber and the primary and secondary coatings are constructed have mutually different coefficients of thermal expansion. For silica ($SiO_2$), of which the actual fiber mainly consists, the coefficient of thermal expansion is $5 \times 10^{-7}/°C$. For synthetic resins, the coefficient of thermal expansion is between approximately 0.5 and $2 \times 10^{-4}/°C$.

When the dual-coated optical fiber is exposed to a decreasing temperature, the comparatively thick secondary coating in particular exerts a compressive force on the optical fiber. The compressive force increases as the temperature decreases. The compressive force adversely influences the optical properties of the optical fiber.

For this reason it has already been suggested that the primary coating should consist of a layer having a buffering effect and remaining soft when the temperature drops. Such a buffering layer prevents mechanical damage from being transmitted from or by the secondary coating to the optical fiber. (See G.B. Patent Application No. 2,065,324A). However, a disadvantage of this construction is that the optical fiber will start buckling within the secondary coating if the secondary coating shrinks considerably in the longitudinal direction. If this phenomenon occurs, the attenuation due to microbending of optical fiber increases considerably.

It has also been suggested to provide the primary-coated optical fiber with a loose secondary coating in the form of a synthetic resin tube. In this case the space between the primary and secondary coatings should be filled with a gel or with air so as to prevent mechanical load if any from being transferred to the optical fiber.

However, when the secondary coating shrinks in the longitudinal direction, this loose coating does not prevent the optical fiber from buckling. The inside of the synthetic resin tube is hardly ever entirely smooth either. In this construction also, all these effects may result in microbending of the optical fiber, when temperature variations or vibrations (for example due to road traffic) occur or when other forces are exerted on the cable (upon winding, laying, and the like). (Microbends are bends in the optical fiber which extend over a few microns to a few millimeters.)

As long as microbending remains in existence, large radiation losses and mode coupling may be the result. As a consequence, the transmission properties of the optical fiber are adversely influenced. The presence of a layer of a lubricant between the primary and the secondary coating provides some but no essential improvement in this respect.

It has also been suggested to make the secondary coating with a synthetic resins having elastic properties which vary only slightly in a given temperature range. A real solution to the problem may not be expected from this suggestion either. The increase of the attenuation still is 1 to 2 dB per km with a drop of the temperature to $-50°$ C. (see in this connection German Auslegeschrift No. 2,723,587, corresponding to U.S. Pat. 4,114,981).

A glass optical fiber having a primary coating of a UV cured acrylate resin and a secondary coating of a UV cured acrylate resin or a thermoplastic copolyester in intimate contact with each other is known from an artical entitled "UV Cured Resin Coating For Optical Fiber/Cable" by G. L. Schief, et al (*Journal of Radiation Curing*, April 1982, pages 11-13). Since there is no indication otherwise, it must be assumed that the properties of the fiber have been determined at a standard temperature of approximately 25° C.

During investigations which led to the present invention, Applicants found that in the Schief, et al construction a large increase in the attenuation of the light signal can occur with temperature fluctuations between $-50°$ and $+80°$ C. In certain circumstances this may be a few dB/km. In practice this is not permissible.

G.B. Patent Application No. 2,065,324A describes a construction having a first buffering layer, a second smooth layer, and a third protective layer. In this construction the buffering layer remains soft at decreasing temperatures. Applicant found, however, that microbending and/or macrobending at low temperature is not prevented.

It was furthermore suggested in German Pat. No. 3,002,363 (corresponding to U.S. Pat. No. 4,334,733) to use a secondary coating consisting of a modified polyamide having a lower modulus of elasticity. The disadvantage of this is that the coated fiber can withstand less forces.

SUMMARY OF THE INVENTION

It is an object of the invention to provide a glass optical fiber having a primary coating and a secondary coating in intimate contact with the primary coating, which satisfies the following requirements:
- it must be possible to handle the primary-coated optical fiber (e.g. during winding, unwinding etc.) without mechanically damaging the fiber and without adversely influencing the optical properties of the fiber,
- the primary coating must have a sufficient buffering effect so that the optical properties are not adversely influenced when the fiber is exposed to radially compressive forces,
- the optical properties must be maintained in a temperature range between $-60°$ and $-80°$ C. when a secondary coating is used having a comparatively high modulus of elasticity.

More particularly, it is an object of the invention to provide a glass optical fiber in which the intrinsic optical properties after providing the coating have been maintained as much as possible and in which the attenuation increases or decreases by not more than 0.5 dB/km and preferably not more than 0.25 dB/km with temperature fluctuations between $-60°$ and $+80°$ C.

According to the invention, this object is achieved by coating a glass optical fiber with a primary coating, having a thickness from 50 to 70 μm, comprising two layers of UV cured acrylate resin. The ratio of the thickness of the first to the thickness of the second layer is from 0.5 to 2. The first layer engaging the fiber has a modulus of elasticity $\leq 5$ N/mm$^2$ and 25° C., and the second layer has a modulus of elasticity from 25 to 1500 N/mm$^2$ at 25° C.

The thickness of the first layer is preferably from 20 to 40 μm. The thickness of the second layer is preferably also from 20 to 40 μm. The ratio of the thickness of the first layer to the thickness of the second layer within the range from 0.5 to 2, is determined substantially by the moduli of elasticity of the second layer of the primary coating and of the secondary coating. In this connection, that ratio must be smaller as the moduli are larger.

It has been found in practice that particularly good results are obtained if the thickness of the first and second layers are 30 μm, and the modulus of elasticity of the UV cured acrylate resin ofthe first primary layer is 2–4 N/mm$^2$ at 25° C., and of the second primary layer of UV cured acrylate resin is 250–500 N/mm$^2$ at 25° C.

The first and second layers of the primary coating may consist of known acrylate resins. The acrylate resins to be considered usually comprise one or more types of oligomers, monomers and a photoinitiator. The properties of the UV cured resins are determined by the type of oligomer and monomer used. Monofunctional monomers provide resin layers having a comparatively low modulus of elasticity, while multifunctional monomers provide resin layers having a larger modulus of elasticity.

Chemically, the resins may comprise, for example, epoxy and/or urethane groups or may be built up on the basis of polyester resins. Upon cooling to $-60°$ C. the modulus of elasticity of the acrylate resins used usually increases to a value exceeding 1500 N/mm$^2$. This applies both to the first and to the second layer of the primary coating. Acrylate resins having the desired moduli of elasticity are marketed by various firms.

The invention provides the advantage that a secondary coating may be used which has a modulus of elasticity of at least 1000 N/mm$^2$ at 25° C.

The secondary coating may consist of a polyamide, for example polyamide 12, having a modulus of elasticity of 1400 N/mm$^2$ at 25° C., and approximately 2000 N/mm$^2$ at $-60°$ C.

Examples of other suitable resins for the secondary coating are polyurethane elastomers, polyvinylidene fluoride, polybutylene terphthalate, polychlorotrifluoroethene, polypropene, polyethene and polyamides, for example polyamide 11, and modifications of these polymers. The moduli of elasticity given hereinbefore and hereinafter are the so-called 2.5% secant moduli.

DESCRIPTION OF THE PREFERRED EMBODIMENTS

Figures 1, 2, 3:
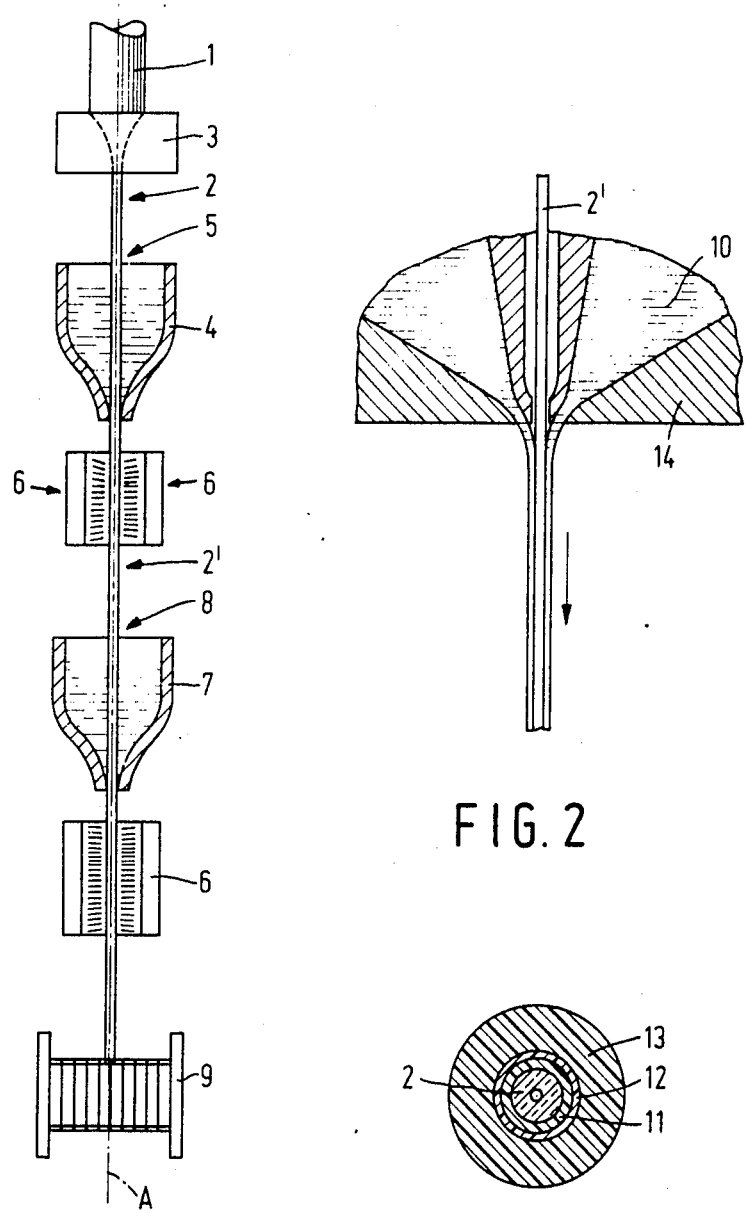
FIG. 1 schematically shows a method of providing a primary coating on an optical fiber according to the invention.
FIG. 2 is a sectional view through an extrusion head.
FIG. 3 is a sectional view through a glass optical fiber.

A fiber 2 is drawn from a glass preform 1 for which may have been obtained, for example, by any of the known processes (e.g. OVD, VAD, MCVD or PCVD). For that purpose, one end of the preform 1 is heated to the drawing temperature in an oven 3 (FIG. 1). The fiber 2 is passed through a container 4 having a UV curable acrylate resin 5 in it. After leaving the container 4, the fiber 2 has a thin resin layer.

The resin-coated fiber is then along a number of ultraviolet radiators 6. The fiber, which now comprises a first layer of UV cured acrylate resin, is guided through a second container 7 having UV curable acrylate resin 8 in it. The second layer is also cured and the coated fiber 2' is then wound on a reel 9.

It is preferred to remove volatile components from the primary coating, if any are present, by heating the coated fiber to a temperature of about 110° C. for example.

The coated optical fiber 2' is then coated with a sheath of a thermoplastic resin 10 as shown in FIG. 2. Only the extrusion head 14 of the extrusion device is shown in FIG. 2.

The finished optical fiber 2 comprises a primary coating, consisting of layers 11 and 12, and a secondary coating 13.

EXAMPLE 1

An optical fiber 2 having an outside diameter of 125 μm was drawn from a preform 1, and then immediately passed through a coating device 4. Device 4 contained a commercial product consisting, according to manufacturers' statement, of a mixture of acrylated urethane oligomers and acrylate monomers (having a modulus of elasticity after UV curing of 4 N/mm$^2$ at 25° C.).

After UV curing, the fiber was passed through a device 7 which contained a commercial product containing, according to manufacturers' statement, a mixture of acrylated epoxyoligomers and acrylate monomers (having a modulus of elasticity after UV curing of 700 N/mm$^2$ at 25° C.). The fiber was then passed through an extrusion device and coated with polyamide 12 (a product obtained from lauryl lactam).

The primary coating obtained in this manner consisted of a first (inner) layer 11 of a cured acrylate resin having a nominal thickness of 25 μm and a modulus of elasticity of 4 N/mm$^2$ at 25° C. The second (outer) nominal thickness of 30 μm and a modulus of elasticity of 700 N/mm$^2$ at 25° C. Both layers had a modulus of elasticity of approximately 2000 N/mm$^2$ at $-60°$ C.

The firmly engaging secondary coating 13 consisted of polyamide 12 having a thickness of 325 μm and a modulus of elasticity of 1400 N/mm$^2$ at 25° C. and 1800 N/mm$^2$ at $-50°$ C. With a cyclic temperature fluctuation between $-60°$ and $+80°$ C., the change in the attenuation during and after 6 cycles was less than 0.1 dB/km.

EXAMPLE 2

In the same manner as described in Example 1, a glass optical fiber 2 was provided with a primary coating consisting of a first layer 11 of a UV cured commercial product consisting, according to manufacturers' statement, of a mixture of acrylated urethane oligomers and acrylate monomers (having a modulus of elasticity after UV curing of 4 N/mm$^2$ at 25° C.). The layer 11 had a thickness of 30 μm and a modulus of elasticity of 4 N/mm$^2$. A second layer of a UV cured commercial product consisting, according to manufacturers' statement, of a mixture of acrylated urethane oligomers and epoxyoligomers and acrylate monomers had a modulus of elasticity of 350 N/mm$^2$ at 25° C.

The secondary coating 13 consisted of polyamide 12 as in Example 1 and with the same thickness. After 6 cycles through temperatures from −60° C. to +80° C., the change in the attenuation during and after the 6 cycles was less than 0.1 dB/km.

EXAMPLE 3

In the same manner as in Example 1, a glass optical fiber was coated with a primary coating consisting of a first layer 11 having a thickness of 40 μm. Layer 11 was made of a UV cured commercial product consisting, according to manufacturers' statement, of a mixture of acrylated urethane oligomers and acrylate monomers (having a modulus of elasticity of 4 N/mm$^2$ at 25° C.). The second layer 12 consisted of a UV cured commercial product, according to manufacturers' statement, of a mixture of acrylated epoxy oligomers and urethane oligomers and acrylate monomers having a thickness of 20 μm (and having a modulus of elasticity of 35 N/mm$^2$ at 25° C.). The secondary coating 13 consisted of polyamide 12 as in Example 1 and having the same thickness. After 2 cycles from −60° C. to +80° C., the change in the attenuation was already less than 0.1 dB/km.

Figure 4:
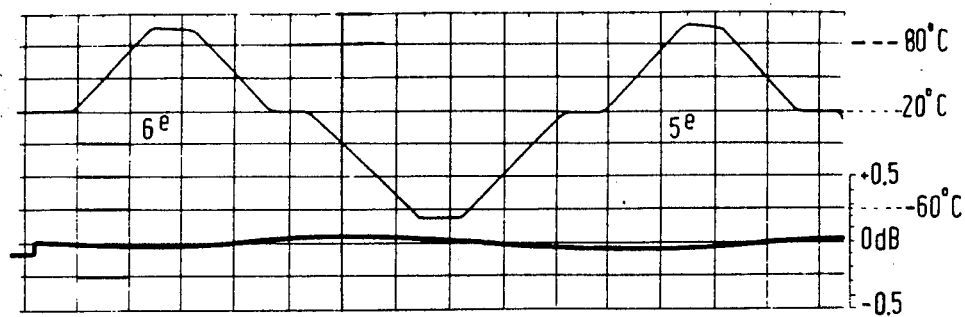
FIGS. 4–6 are graphs showing the attenuations of some optical fibers with respect to the temperature.

FIG. 4 is a graph showing the 5th and 6th temperature cycle to which a fiber according to Example 1 was subjected. The horizontal axis denotes the time in hours. The upper line indicates the temperature variation, the lower line indicates the change in the attenuation. At the onset of the experiment the attenuation was 2.4 dB/km at 850 nm.

Figure 5:
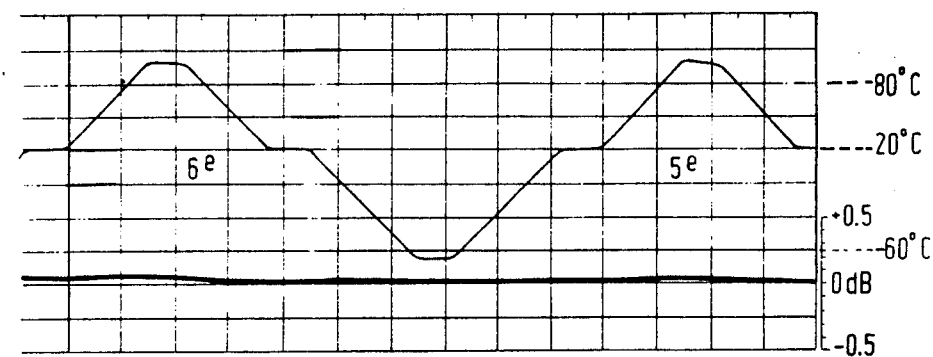

FIG. 5 shows a similar graph for the fiber according to Example 2. At the onset of the experiment the attenuation was 2.5 dB/km at 850 nm.

Figure 6:
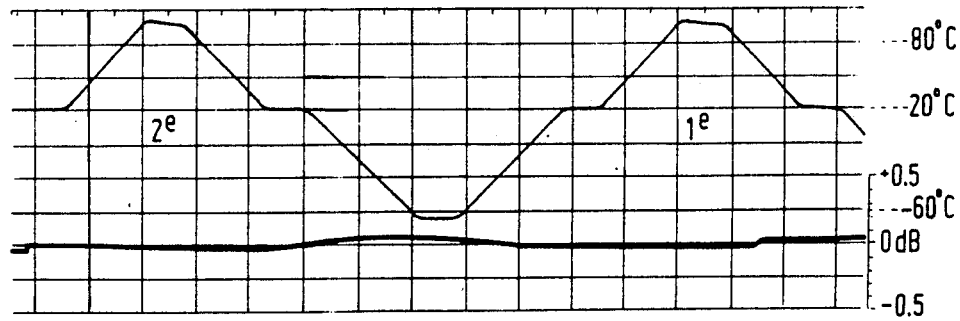

FIG. 6 shows a similar graph of the first and second cycles for the fiber according the Example 3. At the onset of the experiment of the attenuation was 2.7 dB/km at 850 nm.

What is claimed is:

1. A coated optical fiber comprising:
    a glass optical fiber;
    a primary coating on the fiber, said primary coating comprising a UV cured acrylate; and
    a secondary coating surrounding and in intimate contact with the primary coating, said secondary coating comprising a thermoplastic resin;
    characterized in that:
    the primary coating has a thickness of 50 to 70 microns;
    the primary coating consists of an inner primary layer and an outer primary layer of UV cured acrylate, said inner primary layer being in contact with the fiber;
    the ratio of the thickness of the inner primary layer to the thickness of the outer primary layer is from 0.5 to 2;
    the inner primary layer has a modulus of elasticity less than or equal to 5 Newtons per square millimeter at 25° C.; and
    the outer primary layer has a modulus of elasticity from 25 to 1500 Newtons per square millimeter at 25° C.

2. A coated optical fiber as claimed in claim 1, characterized in that the inner primary layer has a thickness from 20 to 40 microns, and the outer primary layer has a thickness from 20 to 40 microns.

3. A coated optical fiber as claimed in claim 1, characterized in that:
    the inner primary layer has a thickness from 25 to 35 microns, and has a modulus of elasticity from 2 to 4 Newtons per square millimeter at 25° C.; and
    the outer primary layer has a thickness from 25 to 35 microns and has a modulus of elasticity from 250 to 500 Newtons per square millimeter at 25° C.

* * * * *